United States Patent [19]

Takino et al.

[11] Patent Number: 4,946,887

[45] Date of Patent: Aug. 7, 1990

[54] TIRE TREAD RUBBER COMPOSITION AND TIRE FOR PASSENGER CAR

[75] Inventors: Hiroshi Takino, Ibaraki; Satoshi Iwama, Takatsuki; Riichiro Ohara, Suita; Noriyuki Isobe; Hiroyuki Tobori, both of Ibaraki; Makoto Komai, Itami, all of Japan

[73] Assignee: Toyo Tire & Rubber Company Limited, Osaka, Japan

[21] Appl. No.: 260,109

[22] Filed: Oct. 20, 1988

[30] Foreign Application Priority Data

Oct. 21, 1987 [JP] Japan ................................ 62-267472
Dec. 28, 1987 [JP] Japan ................................ 62-333827
Dec. 28, 1987 [JP] Japan ................................ 62-333828
Feb. 23, 1988 [JP] Japan ................................ 63-40312

[51] Int. Cl.$^5$ ............................ C08K 3/04; C08L 7/00; C08L 9/00; C08L 9/06

[52] U.S. Cl. ................................ 524/495; 152/209 R; 525/236; 525/237; 524/526

[58] Field of Search ................ 524/495; 525/236, 237; 152/209 R

[56] References Cited

U.S. PATENT DOCUMENTS

| | | |
|---|---|---|
| 4,521,587 | 6/1985 | Furukawa . |
| 4,748,168 | 5/1988 | Kawakami et al. ................ 524/495 |
| 4,748,199 | 5/1988 | Takiguchi et al. ................ 524/495 |

*Primary Examiner*—Allan M. Lieberman
*Attorney, Agent, or Firm*—Armstrong, Nikaido, Marmelstein, Kubovcik & Murray

[57] ABSTRACT

A tire tread rubber composition having a two-peak tanδ characterized in that the temperature distribution curve for loss tangent (tanδ) has two peaks in the range from −120° C. to +100° C. is useful as a tire tread rubber composition.

4 Claims, 2 Drawing Sheets

TIRE TREAD RUBBER COMPOSITION AND TIRE FOR PASSENGER CAR

The present invention relates to a rubber composition and a tire for passenger car.

Heretofore, emphasis has been placed on compatibility in the case where a rubber composition is produced by blending several kinds of rubbers. The resulting rubber blend composition usually has physical properties which are intermediate (or lower than intermediate) those of the constituent rubbers. In order to resolve this situation, the present inventors attempted to produce a blend rubber composition which fully exhibits the characteristic properties of constituent rubbers that are incompatible with one another.

There is an increasing demand for a pneumatic tire capable of high driving performance in keeping with the recent significant improvement in automobile performance and the improvement of roads. The important characteristics required for such a tire include the grip performance (the coefficient of friction between the tread and the road surface) which is related to acceleration performance, braking performance and cornering performance.

The coefficient of friction between the tread and the road surface is associated with the loss tangent (tan$\delta$) of the tread rubber. It is known that the higher the tan$\delta$, the greater the coefficient of friction. On the other hand, the tan$\delta$ is dependent on temperature and frequency (or speed); therefore, the tire grip performance varies depending on the atmospheric temperature and speed.

An object of the present invention is to provide a rubber blend composition for tire tread which permits the individual rubber components to exhibit thier characteristic properties.

An another object of the present invention is to provide a passenger car tire with a tread which has a tan$\delta$ less dependent on temperature and speed, said tire exhibiting outstanding driving stability.

The above and other objects of the present invention will become apparent from the following description.

The present invention provides a tire tread rubber composition having a two-peak tan$\delta$ characterized in that the temperature distribution curve for loss tangent (tan$\delta$) has two peaks in the range from $-120°$ C. to $+100°$ C.

The present invention also provides a passenger car tire having the above tire tread rubber composition.

In the field of plastics, polymer alloys are well developed, and pratically utilized in the creation of new compositions. In the rubber industry, however, this concept has never been utilized for developing unique compositions. The present inventior studied concepts of polymer alloy in regard to rubber technology, and as the result, they found an extremely unique rubber blend composition.

The rubber blend composition of the present invention is composed of rubber components which are incompatible with each other. According to the present invention, the degree of incompatibility of the components is defined by the fact that the temperature distribution curve for tan$\delta$ has two peaks. The rubber blend composition exhibits extremely unique characteristic properties, unlike cnventional rubber blend compositions composed of compatible rubber components.

BRIEF DESCRIPTION OF THE DRAWINGS

"Two-peak tan$\delta$" as used in the present invention does not necessarily mean that there are two distinct peaks in the temperature distribution curve for tan$\delta$ as shown in FIG. 1. It embraces instances in which the curve is not smooth or the distribution is broad as shown in FIG. 2 and 3.

Figure 1:
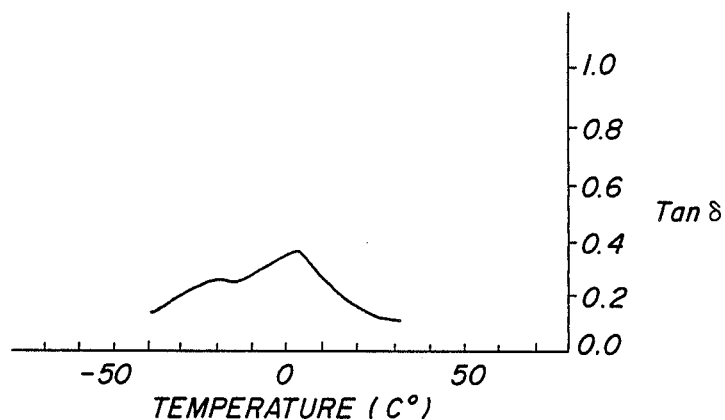

The rubber blend composition of the present invention permits the individual constituent rubber components to fully exhibit their characteristic properties. The mechanism for this may be explained as follows: In the rubber blend composition, the rubber components which are incompatible with each other are dispersed such that one component forms small particles and the other component forms a micellar zone on the interface of said particles, with a very thin portion of the zone being compatible with the particle, like soap micelles.

The tire tread rubber composition of the present invention can be obtained by blending a rubber component (referred to as a component A), having an external double bond, with a second rubber component (referred to as component B) which is a diene rubber having a transition temperature 10° C. or more lower than that of component A. Examples of component A include vinyl-isoprene rubber, styrene-isoprene rubber (SIR) or like rubbers having an external double bond, and polynorbornene rubber. A preferred example is isoprene rubber which contains 50% or more (in total) of 3,4-vinyl bond and 1,2-vinyl bond. Examples of component B include natural rubber (NR), butadiene rubber (BR), styrene-butadiene rubber (SSR), and isoprene rubber (IR), which are conventional rubbers.

According to the present invention, the content of vinyl bonds is determined with an infrared spectro-photometer, Model A-2 made by Japan Spectroscopic Co., Ltd. The content of the cis-1,4-bond, 3,4-vinyl bond, and 1,2-vinyl bond was calculated from the extinction coefficient of the peaks at 840 cm$^{-1}$, 890 cm$^{-1}$, and 910 cm$^{-1}$, respectively. The content of the trans-1,4-bond was calculated by subtracting the total content of the three bonds from 100%.

The proportion of component A and component B can range broad, from about 5/95 to 60/40, preferably from abOut 10/90 to 40/60.

The rubber composition of the present invention is characterized in that the temperature distribution curve for tan$\delta$ has two peaks. In addition, it provides a high-performance tire which is superior in driving stability on both dry and wet roads and in low-temperature characteristics. In the present invention, the loss tangent (tan$\delta$) was measured with a viscoelastic spectrometer made by Iwamoto Seisakusho under simple tension at 100 Hz, 15% static strain, and 0.3% dynamic strain. The specimen measures 0.5 mm thick, 5 mm wide, and 2 cm long.

The rubber composition of the present invention can be obtained by mixing the above-mentioned components using a usual mixer such as a roll mill, Banbury mixer, or kneader. The rubber composition may be incorporated with any known vulcanizing agent, vulcanization accelerator, accelerator activator, retarder, organic peroide, reinforcement, filler, plasticizer, antioxidant, tackifier, and coloring agent.

The tire tread rubber composition of the invention is use to make a passenger car tire.

Namely, the present invention provides a passenger car tire with a tread made of a rubber composition having a two-peak tanδ characterized in that the temperature distribution curve for loss tangent (tanδ) has two peaks in the range from −120° C. to +100° C. The tire tread for the passenger car of the present invention, preferable is a tire tread made of a rubber composition which is composed of an isoprene rubber (component A₁) and a styrene-butadiene rubber (component B₁) in a ratio of 5/95 to 60/40 (by weight) and carbon black having an iodine adsorption value (I A) of 100 mg/g or above, said isoprene rubber containing more than 50% in total of 3,4-vinyl bond and 1,2-vinyl bond, and said styrene-butadiene rubber having a glass transition temperature of 10° C. or more lower than that of said isoprene rubber.

If the isoprene rubber contains less than 50% of vinyl, the resulting rubber composition does not give the two-peak tanδ regardless of the type and amount of styrene-butadiene rubber to be blended with the isoprene rubber, with the result that the rubber composition provides a tire which is poor in driving stability. In addition, if the difference between the two glass transition points is less than 10° C., or if the blending ratio of component A₁ and component B₁ is outside the above-mentioned range, the resulting rubber composition does not give the two-peak tanδ and hence it provides a tire which is poor in driving stability.

The rubber composition of the above is usually incorporated with 50 to 200 parts by weight of carbon black having an iodine adsorption value (I A) of 100 mg/g or above for 100 parts by weight of the rubber component. The I A is measured according to J I S K6221. Carbon black having an I A of 250 mg/g or above is not of practical use because it is hard to mix with rubber. With less than 100 mg/g, improvement in driving stability is poor.

Further, in the present passenger car tire tread, another preferable tread is that made of a rubber composition which is composed of a styrene-isoprene rubber (component A₂) and a styrene-butadiene rubber, natural rubber, or isoprene rubber (component B₂) in a ratio of 5/95 to 60/40 (by weight) and carbon black having an iodine adsorption value (I A) of 100 mg/g or above, said styrene-isoprene rubber containing 5 to 40% of styrene.

If the styrene-isoprene rubber contains less than 5% of styrene, the resulting rubber composition composed of the styrene-isoprene rubber and a styrent-butadiene rubber, natural rubber, or isoprene rubber does not give two peaks of tanδ in the temperature distribution curve. Therefore, the rubber composition odes not provide a high-performance tire of improved drive stability. If the styrene-isoprene rubber contains more than 40% of styrene, the resulting rubber composition is not of practical use on account of its poor processability.

The blending ratio of component A₂ to component B₂ is usually about 5/95 to 60/40, preferably 10/90 to 40/60. With a blending ratio outside the above-mentioned range, the resulting rubber composition odes not give two peaks of tanδ in the temperature distribution curve and hence it does not provide a high-performance tire which needs improved driving stability.

Having two peaks of tanδ, the rubber composition of the present invention permits the individual rubber components to exhibit their own characteristic properties. In addition, it provides a high-performance tire which exhibits very good driving stability. It is considered that the improved driving stability is due to the coefficient of friction (corresponding to tanδ) which remains constant regardless of the speed change in actual running (which corresponds to a temperature change according to the time-temperature reducibility).

The invention will be describved with reference to Examples and Comparative Examples that follow. In the examples, "parts" means "parts by weight."

Figure 2:
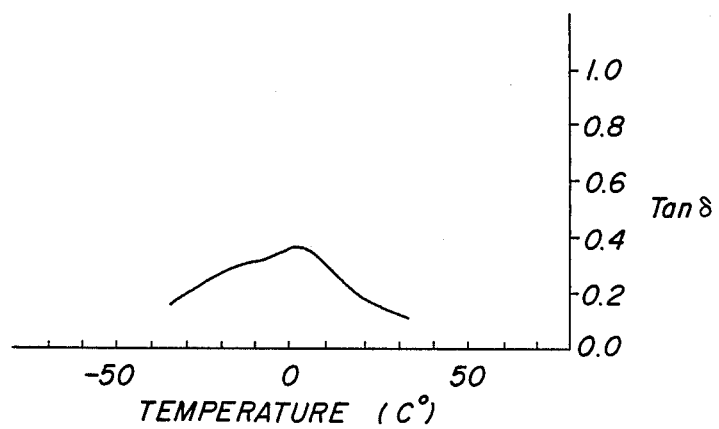
Figure 3:
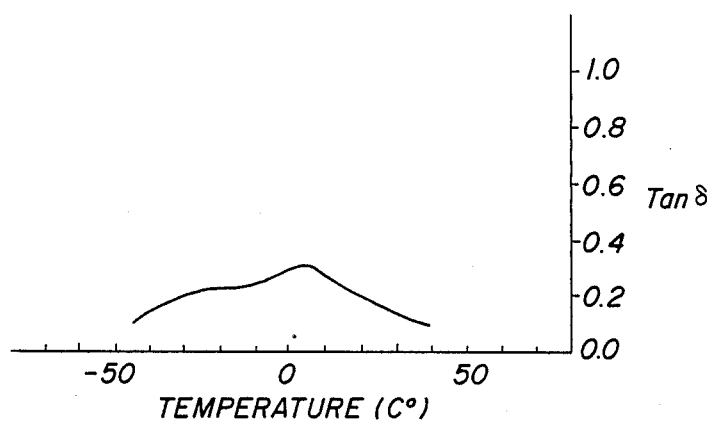
Figure 4:
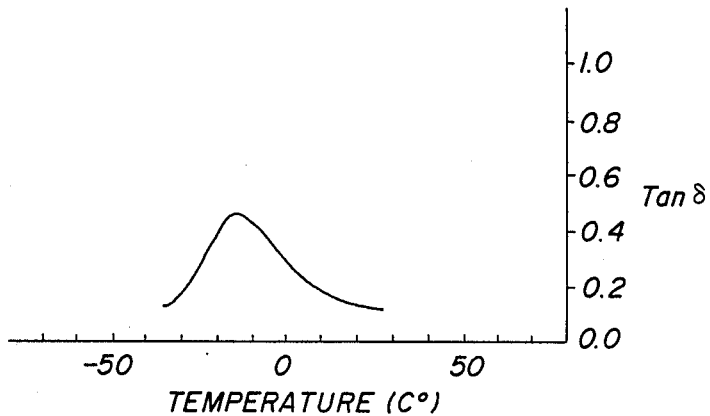
FIG. 4 is an ordinary temperature distribution curve for tan$\delta$ which does not have two peaks.

FIGS. 1 to 3 are graphs showing various embodiments of the invention in which two peaks in tanδ temperature are present in the distribution curve. FIG. 4 shows a usual tanδ temperature distribution curve which does not present two peaks.

Each sample of the rubber composition was made into a tread of a 185/70SR14 tire, and the tire performance was evaluated by measuring the dry and wet road gripping force (dry and wet road driving stability) and low-temperature characteristics using an actual experimental car and a tester.

Driving stability on dry road was evaluated by circuit running and high speed slalom stability. The result of circuit running is expressed in terms of an index calculated from the average time for three runs around the circuit. Composition No. 13 was used as the base (100). The higher the index, the better the driving stability. The high speed slalom stability was determined by running a car with a standard load at 100 km/h through pylons placed at intervals of 35 meters, with the tires inflated at a standard pressure. The results of the slalom stability judged by observation are expressed with Composition No. 13 being the base (5). The greater the number, the better the slalom stability.

Wet μ was measured according to the U.S. UTQGS (the standard for tire quality and grade). The tire under testing, which was fixed on a 5J×14 rim, was mounted on a trailer truck with a load of 336 kg. With a tire pressure of 1.8 kg/cm², the trailer was run on a wet road of dense graded asphalt. The tire was locked during running and the friction resistance resulting from the tire locking was measured. The results are indicated in terms of index, with Composition No. 13 being the base (100). The higher the index, the better the driving stability.

Low-temperature characteristics of Compositions Nos. 1 to 13 were evaluated by measuring the braking distance the test car goes when braked quickly while running at 30 km/h on ice. The results are epressed in terms of index, with Composition No. 13 being the base (100). The higher the index, the better the characteristics.

Abrasion resistance of Compositions Nos. 1 to 13 was measured according to ASTM D2228 using a Pico-type abrasion machine. The results are expressed in terms of index, with Composition No. 13 being the base (100). The higher the index, the better the abrasion resistance.

EXAMPLES AND COMPARATIVE EXAMPLES

A rubber composition was obtained by mixing 100 parts of the blend rubber shown in Table 1, 80 parts of carbon black (N339), 40 parts of aromatic process oil, 3 parts of zinc oxide, 2 parts of stearic acid, 1 part of paraffin wax, 1 part of antioxidant (Santoflex 13), 1.4 parts of vulcanization accelerator (CBS), and 2 parts of sulfur, using a Banbury mixer for 4 minutes. The resulting rubber composition was vulcanized in a mold at 160° C. for 20 minutes, and the properties of the vulcanizate were measured. The results are shown in Table 1. E-SIR in Table 1 stands for emulsion-polymerized styrene-isoprene rubber.

TABLE 1

| Composition No. | Tg (°C.) | Example 1 | 2 | 3 | 4 | 5 | 6 | Com. Example 7 | 8 | 9 | 10 | 11 | 12 | 13 |
|---|---|---|---|---|---|---|---|---|---|---|---|---|---|---|
| Component A | | | | | | | | | | | | | | |
| 60% (3,4 + 1,2-vinyl) IR | −17 | 10 | 20 | 40 | | | 20 | 80 | 90 | | | | | |
| 40% styrene E-SIR | −26 | | | | 20 | | | | | | | | | |
| Polynorbornene | +35 | | | | | 20 | | | | | | | | |
| Component B | | | | | | | | | | | | | | |
| 23.5% styrene SBR | −49 | 90 | 80 | 60 | 80 | 80 | | 20 | 10 | | 100 | 40 | 30 | |
| 35% styrene SBR | −32 | | | | | | 50 | | | 100 | | 30 | 70 | 70 |
| 97% cis-BR | −106 | | | | | | 30 | | | | | 30 | | 30 |
| Tire properties | | | | | | | | | | | | | | |
| Driving stability on dry road | | | | | | | | | | | | | | |
| Circuit running | | 104 | 106 | 106 | 104 | 103 | 105 | 101 | 100 | 101 | 100 | 96 | 101 | 100 |
| High speed slalom stability | | 8 | 9 | 9 | 8 | 8 | 9 | 6 | 6 | 6 | 5 | 3 | 5 | 5 |
| Wet μ | | 105 | 105 | 106 | 104 | 105 | 106 | 106 | 106 | 103 | 98 | 96 | 104 | 100 |
| Low-temperature characteristics | | 106 | 106 | 102 | 105 | 105 | 105 | 90 | 87 | 82 | 99 | 102 | 87 | 100 |
| Abrasion resistance (Pico) | | 102 | 100 | 101 | 100 | 102 | 101 | 92 | 89 | 102 | 100 | 101 | 98 | 100 |

EXAMPLES AND COMPARATIVE EXAMPLES

A rubber composition was obtained by mixing 100 parts of the blend rubber shown in Table 2, 90 parts of carbon black, 45 parts of aromatic process oil, 3 parts of zinc oxide, 2 parts of stearic acid, 1 part of antioxidant (Santoflex 13), 1 part of paraffin wax, 1.4 parts of vulcanization accelerator (CBS), and 2 parts of sulfur, using a Banbury mixer for 4 minutes. Tires were prepared by using the above composition as a tread composition in a usual manner.

The resulting rubber composition was vulcanized in a mold at 160° C. for 20 minutes, and the properties of the vulcanizate were measured. The results are shown in Table 2. Compositions Nos. 19 to 24 were examples, and the other comparative examples.

In table 2, vinyl-isoprene A, B, C and D contain 40%, 50%, 60% and 80% respectively in total of 3,4-vinyl bond and 1,2-vinyl bond, and are −37° C., −26° C., −17° C. and −5° C. respectively in a glass transition temperature (Tg). E-SBR containing 35% of styrene and E-SBR containing 23.5% of styrene have Tg of −32° C. and −49° C. respectively. Carbon black N 110, N 220 and N 330 have an iodine adsorption value (I A) of 142 mg/g, 117 mg/g and 874 mg/g respectively.

EXAMPLES AND COMPARATIVE EXAMPLES

A rubber composition was obtained by mixing 100 parts of the blend rubber shown in Table 3, 90 parts of carbon black, 45 parts of aromatic process oil, 3 parts of zinc oxide, 2 parts of stearic acid, 1 part of antioxidant (Santoflex 13), 1 part of paraffin wax, 1.4 parts of vulcanization accelerator (CBS), and 2 parts of sulfur, using a Banbury mixer for 4 minutes. Tires were prepared by using the above composition as a tread composition in a usual manner.

The resulting rubber composition was vulcanized in a mold at 160° C. for 20 minutes, and the properties of the vulcanizate were measure. The results are shown in Table 3. Compositions Nos. 25 to 31 were examples, and the other comparative examples.

In Table 3, SIR is styrene-isoprene rubber, SBR styrene-butadiene rubber and NR natural rubber. SIR containing no styrene is synthetic polyisoprene rubber.

In Tables 2 and 3, circuit running and high speed slalom stabiity were tested in the same manner as in the experiments shown in Table 1. Low speed slalom stability was determined by running a car having the same load and the tires at 40 km/h through pylons placed at intervals of 15 meters.

TABLE 2

| Composition No. | vinyl bond | Tg (°C.) | Com. Example 14 | 15 | 16 | 17 | 18 | Example 19 | 20 | 21 | 22 | 23 | 24 |
|---|---|---|---|---|---|---|---|---|---|---|---|---|---|
| Vinyl-isoprene | | | | | | | | | | | | | |
| A | 40% | −37 | | 20 | | | | | | | | | |
| B | 50% | −26 | | | 20 | | | 20 | | | | | |
| C | 60% | −17 | | | | 70 | 20 | | 20 | 5 | 60 | 20 | |
| D | 80% | −5 | | | | | | | | | | | 10 |
| 35% styrene E-SBR | | −32 | | | | 80 | | | | | | | |
| 23.5% styrene E-SBR | | −49 | 100 | 80 | | 30 | 80 | 80 | 80 | 95 | 40 | 80 | 90 |
| Carbon black | | IA | | | | | | | | | | | |
| N 110 | | 142 | | | | | | | | | | 90 | |
| N 220 | | 117 | 90 | 90 | 90 | 90 | | 90 | 90 | 90 | 90 | | 90 |
| N 330 | | 87 | | | | | 90 | | | | | | |
| Difference in Tg | | | — | 12 | 6 | 32 | 32 | 23 | 32 | 32 | 32 | 32 | 44 |
| Circuit running | | | 100 | 100 | 103 | 103 | 100 | 104 | 104 | 103 | 105 | 107 | 106 |
| High speed slalom stability | | | 5 | 6 | 8 | 8 | 6 | 8 | 9 | 7 | 9 | 10 | 8 |
| Low speed slalom stability | | | 5 | 6 | 6 | 6 | 5 | 8 | 8 | 7 | 9 | 10 | 9 |

TABLE 3

| Composition No. | styrene content | Tg (°C.) | Example 25 | 26 | 27 | 28 | 29 | 30 | 31 | Com. Example 32 | 33 | 34 | 35 |
|---|---|---|---|---|---|---|---|---|---|---|---|---|---|
| Polymer | | | | | | | | | | | | | |
| | 0% | −61 | | | | | | | | | 20 | | |
| | 10% | −50 | 30 | 60 | | | | | | | | 80 | |

TABLE 3-continued

| | | Tg | 1 | 2 | 3 | 4 | 5 | 6 | 7 | 8 | 9 | 10 | 11 |
|---|---|---|---|---|---|---|---|---|---|---|---|---|---|
| SIR | 24% | −32 | | | 20 | 30 | | | 20 | | | | 20 |
| | 40% | −10 | | | | | 20 | 5 | | 20 | | | |
| SBR | 23.5% | −49 | | | 80 | | 80 | 95 | 80 | 100 | 80 | | 80 |
| | 35% | −32 | 70 | 40 | | | | | | | | 20 | |
| NR | | −62 | | | | 70 | | | | | | | |
| Carbon black | | IA | | | | | | | | | | | |
| N 110 | | 142 | | | | | | | 90 | | | | |
| N 220 | | 117 | 90 | 90 | 90 | 90 | 90 | 90 | | 90 | 90 | 90 | |
| N 330 | | 87 | | | | | | | | | | | 90 |
| Circuit running | | | 108 | 107 | 107 | 105 | 107 | 105 | 108 | 100 | 97 | 102 | 102 |
| High speed slalom stability | | | 8 | 8 | 8 | 8 | 7 | 7 | 9 | 5 | 4 | 6 | 6 |
| Low speed slalom stability | | | 8 | 7 | 8 | 7 | 9 | 7 | 8 | 5 | 3 | 6 | 5 |

We claim:

1. A passenger car tire with a tire tread made of a rubber composition which is composed of an isoprene rubber and a styrene-butadiene rubber in a ratio of 5/95 to 60/40 (by weight) and 50 to 200 parts by weight of carbon black having an iodine adsorption value (IA) of 100 mg/g or above, said isoprene rubber containing more than 50% in total of 3,4-vinyl bond and 1,2-vinyl bond, and said styrene-butadiene rubber having a glass transition temperature lower by 10° C. or more than that of said isoprene rubber, said tire tread rubber composition having a two-peak tanδ characterized in that the temperature distribution curve for loss tangent (tanδ) has two peaks in the range from −120° C. to +100° C.

2. A passenger car tire with a tread made of a rubber composition which is composed of a styrene-isoprene rubber and a styrene-butadiene rubber, natural rubber, or isoprene rubber in a ratio of 5/95 to 60/40 (by weight) and 50 to 200 parts by weight of carbon black having an iodine adsorption value (IA) of 100 mg/g or above, said styrene-isoprene rubber containing 5 to 50% of sytrene, said tire tread rubber composition having a two-peak δ characterized in that the temperature distribution curve for loss tangent (tanδ) has two peaks in the range from −120° C. to +100° C.

3. A tire tread rubber composition composed of a blend of first and second rubber components, the first component being an isoprene rubber or styrene-isoprene rubber containing 50% or more of 3,4-vinyl and 1,2-vinyl bonds or the first component being polynorbornene;

the second component being a diene rubber having a glass transition temperature of 10° C. or more lower than that of the first component, the ratio of the first and second components being 5/95 to 60/40 by weight; and carbon black in amounts of 50 to 200% by weight;

the tire tread rubber composition having a 2-peak tanδ characterized in that the temperature distribution curve for loss tangent (tanδ) has 2 peaks in the range of from −120° C. to +100° C.

4. A passenger car tire with a tread made of the rubber composition of claim 3.

* * * * *